Patented July 17, 1923.

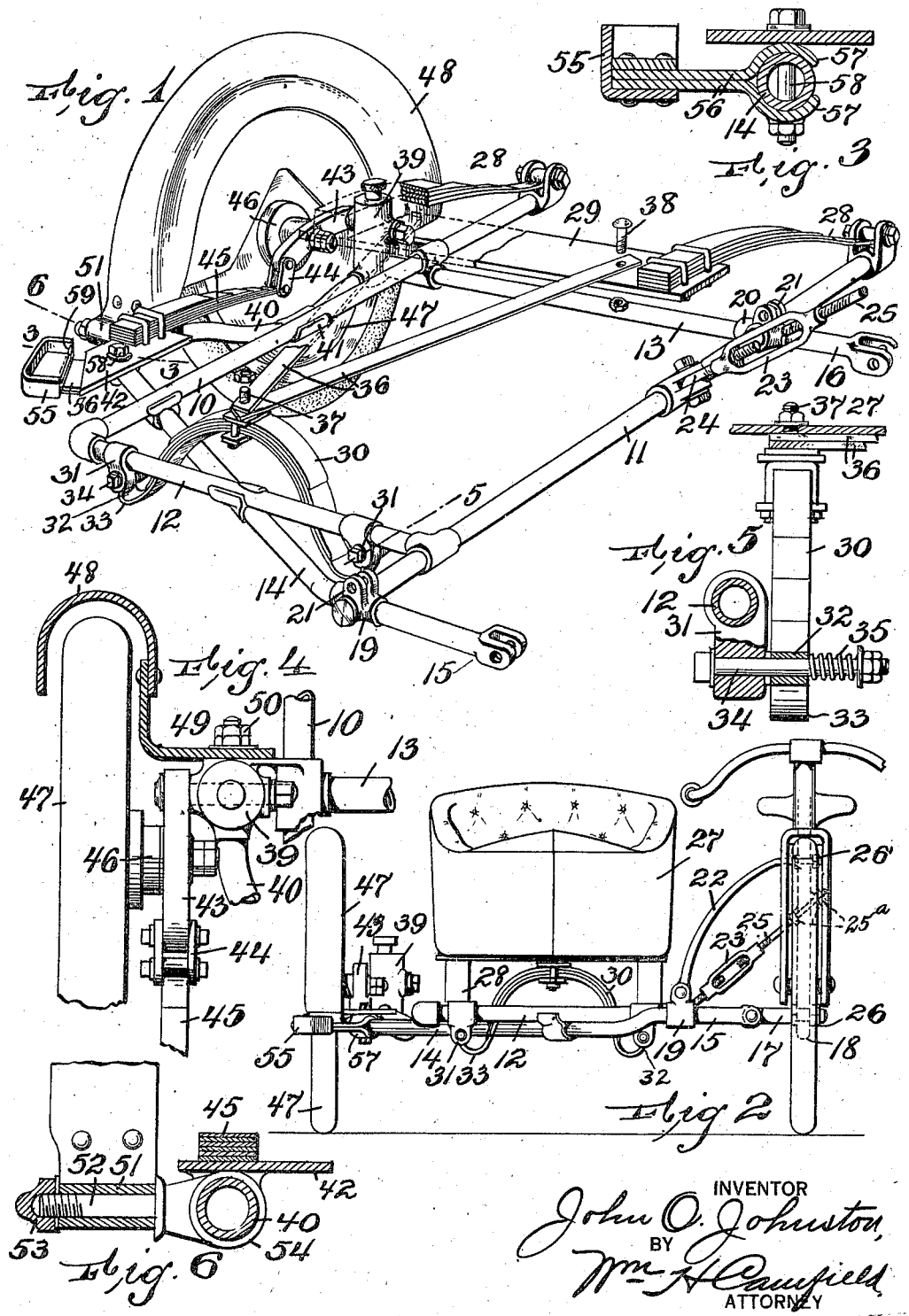

1,461,759

UNITED STATES PATENT OFFICE.

JOHN O. JOHNSTON, OF NEWARK, NEW JERSEY.

SIDE CAR FOR MOTOR CYCLES.

Application filed January 14, 1922. Serial No. 529,109.

*To all whom it may concern:*

Be it known that I, JOHN O. JOHNSTON, a citizen of the United States, and a resident of Newark, county of Essex and State of New Jersey, have invented certain new and useful Improvements in Side Cars for Motor Cycles, of which the following is a specification.

This invention relates to an improved side car for motorcycles, and is particularly directed to the frame of the side car and the manner of attaching it to the motor-cycle proper.

The invention relates further to a frame for side cars, which frame is novel in its whole make-up, but particularly in that part that provides for a flexible support between the frame and the wheel, which enables the wheel to conform vertically to unevenness in the road without transmitting any major shocks to the frame and body of the car.

Invention also resides in certain details of construction which will be more fully described hereinafter and also embodied in the claims.

The invention is illustrated in the accompanying drawing, in which Figure 1 is a perspective view of the frame of the side car with the body removed. Figure 2 is a front view of the improved side car attached to a motorcycle. Figure 3 is an enlarged detail section on line 3—3 in Figure 1. Figure 4 is a top view of the connection between the wheel and the frame, and showing a part of the wheel guard in section. Figure 5 is a detail section on line 5 in Figure 1, and Figure 6 is a similar section taken on line 6 in Figure 1.

The main part of the frame comprises side bars 10 and 11, a front bar 12, a rear bar 13 and a tie-bar 14 which passes from a front extension of the side bar 11 obliquely to the other side under the bars 12 and 10, all these parts being rigidly secured together, as by welding, and suitable couplings where they cross or abut.

The inner side is secured to the motorcycle proper, and to provide for such fastening, projecting bars, such as the bar 15 in continuation of the tie-bar 14, and the bar 16 in continuation of the rear bar 13, are connected to suitable rods 17, these rods 17 being the usual rods now employed for the purpose in conventional side bar connections, the front one being detachably secured to the frame 18 of the motorcycle just in rear of the front wheel, and the rear one just in front of the rear wheel.

Couplings 19 and 20 connect these projecting bars to the main frame, and have means, such as ears 21, to which struts 22 are secured, these struts being fastened to the frame 18 near the top of the frame.

To regulate the position of the motorcycle proper relative to the side car frame, and thus insure its vertical position, I provide an adjustable brace which is illustrated in the drawing as a turnbuckle 23 connecting rods 24 and 25, the rod 24 being secured to the side bar 12, and the rod 25 being secured to the frame 18 of the motorcycle, preferably substantially central thereof. as, for instance, to the post extending from the pedal shaft to the seat, and, say, half way up in order to give the brace an inclined or truss position. The rod 25 is screw-threaded, and on each side of the motorcycle proper it is provided with a nut 25$^a$, and by adjusting these along the threaded part of the rod 25 a proper adjustment can be secured, although such adjustment in the main will be unnecessary, due to the adjustment possible through the turnbuckle 23. The main adjustment is therefore through the turnbuckle 23.

Hinged to the bars 15 and 16 are bars 17 which pass through the frame of the motorcycle proper and have their ends screwthreaded, and nuts 26' on opposite sides of the frame of the motorcycle proper are tightened up on these screw-threaded portions so as to hold the bars 17 firmly in position. When the motorcycle has been positioned in vertical position on the turnbuckle, the nuts 26 on the screw-threaded end of the struts 22 are screwed up tight on opposite sides of the frame of the motorcycle, thus adjustably securing these struts to the motorcycle proper, the struts at their other end being pivotally secured to the couplings 19 and 20, these couplings having the ears 21 for this purpose. The turnbuckle is also utilized in readjustments necessitated by wear.

The body 27 of the side car is supported by springs, preferably two in the back and one in the front, the springs 28 being arranged longitudinally at the back and being secured to the rear ends of the side bars 10 and 11, and being held against lateral displacement at their forward ends by a connection such as the board 29. The front spring 30 is preferably arranged transversely on the front part of the frame, having clips 31, secured to the front bar, serving as supports for the ends 32 of the spring, these ends being curved so as to form a return bend 33 to minimize recoil.

The pivotal pin 34 on each clip, which pins form supports for the ends 32 of the spring, also acts as a guide and abutment for the small springs 35, so that the twist of sudden starting or swerving is taken up by these small springs 35 and the spring 30 is thus relieved, since each eye or end 32 of the spring 30 is slidable on its bolt 34.

In addition to the body 27 I prefer other bracing means for the front spring, such as the bars 36, the front ends being secured over the bolt 37, which also serves to hold the front part of the body, and having their rear ends adapted to be fastened by such means as the bolts 38, which hold the rear part of the body to the springs 28 through the connection 29.

On the outer side of the frame is arranged a mounting for supporting the frame on the wheel of the side car, which mounting is also adapted for use at its front end as a support for the front part of the wheel guard and also for a step. This construction provides for a rigid fixing of the wheel guard to the frame of the motorcycle, but leaves the wheel free to vibrate in its supporting position and to move within the wheel guard, and also includes a flexible connection by means of which the wheel can adjust itself quickly to an uneven road without imparting the major shocks to the frame.

On the end of the rear bar 13 I arrange a post 39 which is solidly placed on the end of the bar 13 and is further braced by a brace bar 40 secured to the post 39, fastened by welding 41 or similar connection to the side bar 10, and then projects in the direction of the end of the tie-bar 14, the brace bar 40 and the tie-bar 14 being fastened together usually by means of a plate 42.

A lever 43 is pivoted at one end to the post 49, and at its other end is fastened, as by links 44, to a spring 45, the resilient end of the spring being attached to the links 44, and its less flexible end being secured to the plate 42. Intermediate of its ends the rocking lever provides a bearing for the hub 46 of the wheel 47.

A suitable guard 48 covers the upper part of the wheel and prevents contact with the wheel, and is fastened at its rear end, as shown in Figure 4, by means of the flange 49 to the rear side of the post 39, as by means of the nuts 50, and on its front end is formed into an eye 51, shown in Figure 6, which eye is secured on a post 52 and held against accidental removal by a nut 53, the post 52 being in extension of a bracket 54 which is fastened by welding or other means to the front end of the brace bar 40 and to the plate 42.

At a convenient angle I arrange the step 55, which is provided with a suitable clamp 56, preferably a pair of plates that are bent at their ends into jaws 57 to embrace the end of the tie-bar 14, and a bolt 58 passes through the jaws 57, the tie-bar 14 and the plate 42 so as to fasten these parts together, as will be seen from Figure 3. The step 55 is preferably cup-shaped and is adapted to receive a block 59 of rubber or similar resilient material, if desired.

It will be evident from this description that when the side car is travelling over a rough road, any marked depression or projection in the road with which the wheel 47 engages will cause a marked vertical movement of this wheel, which transmits it through the hub 46 to the rocking lever 43. The rocking lever 43 swings on its pivotal connection with the post 39, and at its other end, due to its connection with the spring 45, has a means for absorbing the shock, at least a major portion thereof, and again resumes its normal supporting position without such shock having been, to any great extent, transmitted to the frame.

It will be evident that minor changes can be made in the arrangement and disposition and also the construction of the parts without departing from the scope of the invention.

I claim:

1. A frame for motorcycle side cars comprising side bars, a front bar, a rear bar, one side bar having a front extension thereon, a tie-bar extending from said extension obliquely to the rear, and a connection between the end of the tie-bar and the rear bar for supporting a wheel.

2. A frame for motorcycle side cars comprising side bars, a front bar, a rear bar, one side bar having a front extension thereon, a tie-bar extending from said extension obliquely to the rear, and a connection between the end of the tie-bar and the rear bar for supporting a wheel, said connection including a spring.

3. A frame for motorcycle side cars comprising side bars, a front bar and a rear bar, one side bar having a front extension thereon, a tie-bar extending from said extension obliquely to the rear and beyond the other side bar to form a free end, and a connection between the end of the tie-bar and the rear bar, said connection including a rocking lever connected at one end to the rear bar, a spring connecting the rocking lever with the free end of the tie-bar, and a mounting for the axle of a wheel on the rocking lever intermediate its ends.

4. A frame for motorcycle side cars comprising side bars, a rear bar and a front bar, one of the side bars having a front extension thereon, a tie-bar extending from the extension laterally slightly to the rear, a post on the end of the rear bar, a rocking lever secured at one end to the post, a bearing intermediate its ends for supporting a wheel, a spring arranged to support the free end of the rocking lever, and means for supporting said spring on the end of the tie-bar.

5. A frame for motorcycle side cars comprising side bars, a rear bar and a front bar, a tie-bar extending from the front end of one of the side bars and projecting laterally and slightly to the rear beyond the other side bar, a plate fastened to the free end of the tie-bar, a post on the frame, a rocking lever secured at one end to the post, a spring secured to the plate and supporting the other end of the rocking lever, means for supporting a wheel on the rocking lever intermediate of its ends, a wheel guard, and means for securing the wheel guard to the plate and to the post.

6. A frame for motorcycle side cars comprising side bars, a rear bar and a front bar, a tie-bar extending from the front end of one of the side bars and projecting laterally and slightly to the rear beyond the other side bar, a plate fastened to the free end of the tie-bar, a post on the frame, a rocking lever secured at one end to the post, a spring secured to the plate and supporting the other end of the rocking lever, means for supporting a wheel on the rocking lever intermediate of its ends, a wheel guard, means for securing the wheel guard to the plate and to the post, and a step secured to said plate and projecting in front of the wheel guard.

7. A frame for motorcycle side cars comprising a frame proper of rigid construction, means for securing a wheel to said frame, said means including a rocking lever and a spring secured together at their abutting ends, the projecting ends of the lever and the spring being secured to the frame, and means on the lever closely adjacent to the spring for the attachment of a wheel thereto.

8. A frame for motorcycle side cars comprising side bars and a front bar, horizontal longitudinally extending bolts secured to the front bar, a spring having eyes at its ends slidably arranged on said bolts, and resilient means on the bolts to yieldingly resist the sliding of the eyes on the bolts.

In testimony that I claim the foregoing, I have hereto set my hand, this 12th day of January, 1922.

JOHN O. JOHNSTON.